(12) United States Patent
Komatsuda et al.

(10) Patent No.: US 11,500,364 B2
(45) Date of Patent: Nov. 15, 2022

(54) INDEX SELECTION DEVICE AND METHOD

(71) Applicant: Hitachi, Ltd., Tokyo (JP)

(72) Inventors: Takuya Komatsuda, Tokyo (JP);
Machiko Asaie, Tokyo (JP); Keiro Muro, Tokyo (JP)

(73) Assignee: HITACHI, LTD., Tokyo (JP)

( * ) Notice: Subject to any disclaimer, the term of this patent is extended or adjusted under 35 U.S.C. 154(b) by 397 days.

(21) Appl. No.: 15/916,312

(22) Filed: Mar. 9, 2018

(65) Prior Publication Data
US 2019/0064788 A1 Feb. 28, 2019

(30) Foreign Application Priority Data
Aug. 28, 2017 (JP) .............................. JP2017-163813

(51) Int. Cl.
*G05B 23/02* (2006.01)
*G06F 11/30* (2006.01)
(Continued)

(52) U.S. Cl.
CPC ....... *G05B 23/0254* (2013.01); *G05B 23/024* (2013.01); *G05B 23/0281* (2013.01);
(Continued)

(58) Field of Classification Search
None
See application file for complete search history.

(56) References Cited

U.S. PATENT DOCUMENTS

| 2003/0045007 A1* | 3/2003 | Tanaka | H01L 22/20 438/5 |
| 2004/0158432 A1* | 8/2004 | King | G05B 23/0281 702/183 |

(Continued)

FOREIGN PATENT DOCUMENTS

| JP | 2010231452 A | * 10/2010 |
| JP | 2016-206784 A | 12/2016 |

OTHER PUBLICATIONS

JP-2010231452-A translation (Year: 2010).*

(Continued)

*Primary Examiner* — Lina M Cordero
(74) *Attorney, Agent, or Firm* — Mattingly & Malur, PC

(57) ABSTRACT

Indexes having local features are automatically selected from sensor data of a plurality of sensors. Sensor data of the plurality of sensors, each associated with the plurality of indexes, is partitioned into a plurality of blocks. A principal component analysis is applied to the sensor data of each of the partitioned blocks and a plurality of principal components are extracted from each of the blocks. A migration distance evaluation unit extracts, from two different blocks, two principal components that form a principal component pair, and calculates a migration distance between each of the principal components regarding the extracted principal component pair. A migration factor index detection unit detects, as a migration factor index, an index among the plurality of indexes configuring the principal components having a large migration distance among the migration distances between each of the principal components calculated by the migration distance evaluation unit.

12 Claims, 17 Drawing Sheets

(51) Int. Cl.
  *G06F 11/32* (2006.01)
  *G06F 11/07* (2006.01)

(52) U.S. Cl.
  CPC ...... *G06F 11/3013* (2013.01); *G06F 11/3072* (2013.01); *G06F 11/3082* (2013.01); *G06F 11/321* (2013.01); *G06F 11/079* (2013.01); *G06F 11/3006* (2013.01); *G06F 2201/81* (2013.01)

(56) References Cited

U.S. PATENT DOCUMENTS

| | | | | |
|---|---|---|---|---|
| 2007/0050076 | A1* | 3/2007 | Yamazaki | H01J 37/32935 700/121 |
| 2007/0129836 | A1* | 6/2007 | Hendler | G05B 23/0281 700/110 |
| 2008/0294382 | A1* | 11/2008 | Lim | H01L 21/67288 702/185 |
| 2013/0182954 | A1* | 7/2013 | Pellegrini | G06K 9/6247 382/170 |
| 2015/0318221 | A1* | 11/2015 | Kim | G01B 5/043 702/182 |
| 2016/0116892 | A1* | 4/2016 | Cheng | G05B 19/41875 700/108 |
| 2016/0179599 | A1* | 6/2016 | Deshpande | G06F 16/215 714/807 |
| 2018/0024875 | A1* | 1/2018 | Della Corte | G06F 11/079 714/37 |

OTHER PUBLICATIONS

JP 2016206784 A, translation (Year: 2016).*
Jolliffe, Ian. Principal component analysis. John Wiley & Sons, 2002.

* cited by examiner

FIG.9

MIGRATION DISTANCE EVALUATION SCREEN

SETTING OF MIGRATION DISTANCE EVALUATION

COMMONALITY LEVEL THRESHOLD OF INDEX: 60%

MIGRATION DISTANCE DETERMINATION THRESHOLD: 15%

[EXECUTE MIGRATION DISTANCE EVALUATION]

CONFIRMATION OF PRINCIPAL COMPONENT PAIR

BLOCK PAIR SELECTION

JANUARY ▼
FEBRUARY ▼

| PRINCIPAL COMPONENT OF JANUARY DATA | PRINCIPAL COMPONENT OF FEBRUARY DATA | COMMONALITY LEVEL | MIGRATION DISTANCE |
|---|---|---|---|
| FIRST PRINCIPAL COMPONENT | FIRST PRINCIPAL COMPONENT | 80% | 20% |
| SECOND PRINCIPAL COMPONENT | SECOND PRINCIPAL COMPONENT | 40% | 40% |
| THIRD PRINCIPAL COMPONENT | THIRD PRINCIPAL COMPONENT | 20% | 50% |
| FOURTH PRINCIPAL COMPONENT | FOURTH PRINCIPAL COMPONENT | 10% | 70% |
| FIFTH PRINCIPAL COMPONENT | FIFTH PRINCIPAL COMPONENT | 10% | 80% |

FIG.11

| LOG ID (901) | DATA ACQUISITION TIME (902) | "INDEX 0001" (903) | "INDEX 0002" (904) | ... | "INDEX 2000" (905) |
|---|---|---|---|---|---|
| 1 | 2017/01/01 01:00:00 | 0 | 0 | | 146 |
| 2 | 2017/01/01 02:00:12 | 1 | 0 | | 99 |
| 3 | 2017/01/01 03:00:21 | 3 | 0 | | 233 |
| 4 | 2017/01/01 04:00:31 | 3 | 1 | | 189 |
| 5 | 2017/01/01 05:01:43 | 0 | 0 | | 57 |
| 6 | 2017/01/01 06:01:01 | 0 | 0 | | 46 |
| ⋮ | ⋮ | ⋮ | ⋮ | | ⋮ |

| LOG ID (901) | BLOCK ID (1002) |
|---|---|
| 1 | 1 |
| 2 | 1 |
| ⋮ | ⋮ |
| 45006 | 2 |
| ⋮ | ⋮ |

1000

| BLOCK ID | PRINCIPAL COMPONENT ID | INDEX ID | FACTOR LOADING |
|---|---|---|---|
| 1 | 1 | 3 | 0.7207 |
| 1 | 1 | 1229 | 0.7076 |
| 1 | 1 | 758 | 0.6643 |
| 1 | 1 | 203 | 0.6349 |
| 1 | 1 | 367 | 0.5883 |
| 1 | 2 | 1987 | -.07498 |
| ⋮ | ⋮ | ⋮ | ⋮ |

| BLOCK ID | PRINCIPAL COMPONENT ID | PAIR BLOCK ID | PAIR PRINCIPAL COMPONENT ID | MIGRATION DISTANCE | DETECTION FLAG |
|---|---|---|---|---|---|
| 1 | 1 | 2 | 1 | 0.25 | T |
| 1 | 2 | 2 | 3 | 0.33 | F |
| 1 | 3 | 2 | 2 | 0.5 | F |
| 1 | 4 | 2 | 4 | 0.5 | F |
| 1 | 5 | 2 | 5 | 0.6 | T |
| 2 | 1 | 3 | 2 | 0.3 | F |
| ⋮ | ⋮ | ⋮ | ⋮ | ⋮ | ⋮ |

FIG.20

| INDEX ID | PRINCIPAL COMPONENT ID | BLOCK ID | LOCAL FEATURE FLAG | FAILURE FACTOR FLAG | EXECUTION ID |
|---|---|---|---|---|---|
| 3 | 1 | 1 | T | T | 1 |
| 1229 | 1 | 1 | F | T | 1 |
| 563 | 1 | 2 | T | F | 1 |
| 17 | 1 | 2 | T | T | 1 |
| 320 | 2 | 1 | F | F | 1 |
| 1008 | 2 | 2 | F | F | 1 |
| ⋮ | ⋮ | ⋮ | ⋮ | ⋮ | ⋮ |

FIG.21

| EXECUTION ID | EXECUTION START TIME | NUMBER OF RECORDS | NUMBER OF BLOCKS | MIGRATION DISTANCE DETERMINATION THRESHOLD |
|---|---|---|---|---|
| 1 | 2017/05/01 13:01:45 | 540,060 | 6 | 0.2 |
| 2 | 2017/05/01 13:24:11 | 540,060 | 12 | 0.2 |
| 3 | 2017/05/01 13:31:00 | 540,060 | 12 | 0.4 |
| 4 | 2017/05/01 13:50:37 | 45,005 | 10 | 0.2 |
| ⋮ | ⋮ | ⋮ | ⋮ | ⋮ |

INDEX SELECTION DEVICE AND METHOD

TECHNICAL FIELD

The present invention relates to an index selection device and an index selection method.

BACKGROUND ART

If an unexpected failure occurs in relation to equipment maintenance, it is necessary to perform emergency maintenance separately from regular maintenance, and maintenance costs will increase. There are demands for detecting failure prognosis in order to prevent failure before it happens.

In order to detect failure prognosis, steps of installing numerous sensors on the equipment, collecting data from the sensors, and analyzing the collected data are being taken. In failure prognosis analysis, data is input to a machine learning approach such as an SVM (Support Vector Machine) or a decision tree, and failure determination rules are created. Subsequently, by inputting the most recently collected sensor data in the failure determination rules, whether or not the equipment will encounter a failure by the next regular maintenance is predicted.

With regard to the machine learning approach, for example, an SVM creates a boundary line for separating data just before the failure and other normal data from past sensor data, and performs failure prognosis by comparing the created boundary line and the sensor values. Moreover, for example, a decision tree evaluates failure prognosis by confirming the sensor values in order from the sensors that are more closely related to the failure.

With regard to equipment deemed to encounter a failure as a result of the analysis, the occurrence of emergency maintenance can be prevented by taking measures in advance during regular maintenance.

When there are numerous sensors to be input to the machine learning approach, the accuracy of predicting the incidence of failure will deteriorate due to differences in dimensions and mathematical properties of multi-collinearity. It is therefore necessary to select an appropriate number of sensors. In the ensuing explanation, the term "sensor" is referred to as an "index".

Conventionally, domain experts selected the number of indexes for inputting data in machine learning based on experience. Nevertheless, when there are several thousand types of indexes, the indexes cannot be examined carefully because there are too many indexes. Accordingly, there are demands for automatically selecting the indexes.

NPTL 1 describes a method using principal component analysis as the method of selecting proper indexes among vast quantities of indexes. Foremost, principal component analysis is applied to vast quantities of indexes, and principal components are thereby created. Because principal component analysis configures principal components by integrating highly correlated indexes, indexes having the highest correlation with the principal components are selected among the indexes configuring the principal components. By selecting one index among the integrated indexes, it is possible to select indexes having mutually independent relations rather than simultaneously selecting highly correlated indexes.

Meanwhile, principal component analysis is characterized in that it ignores the local features of the indexes in order to integrate the indexes by capturing the overall tendency of the index values. Here, the term "local feature" refers to a feature in which the distribution is similar to other indexes during a certain period, but not similar to the corresponding index during a different period. Upon discovering equipment failure, it is necessary to select indexes with local features because local features may become important information.

Moreover, as a technique of selecting indexes with local features, the technology described in PTL 1 is known. In PTL 1, indexes that represent the overall feature of the system are selected based on principal component analysis, and indexes that represent the local features of the system are selected by being designated by the user. While the user may discover indexes that represent a local state change when the total number of indexes is small, it is difficult for the user to discover a local state change among vast quantities of indexes when there are several thousand to several ten thousand indexes.

CITATION LIST

Patent Literature

PTL 1: Japanese Unexamined Patent Application Publication No. 2016-206784

Non-Patent Literature

NPTL 1: Jolliffe, Lan. Principal component analysis. John Wiley & Sons, 2002.

SUMMARY OF THE INVENTION

Problems to be Solved by the Invention

An object of the present invention is to automatically select indexes having local features from sensor data of a plurality of sensors.

Means to Solve the Problems

In order to achieve the foregoing object, the present invention provides an index selection device, comprising: a data partitioning unit which inputs sensor data of a plurality of sensors each associated with a plurality of indexes, and partitions the input sensor data of each of the sensors into a plurality of blocks; a principal component analyzing unit which applies principal component analysis to each of the blocks partitioned by the data partitioning unit, and extracts a plurality of principal components from each of the blocks; a migration distance evaluation unit which extracts, from two different blocks, two principal components that form a principal component pair among the plurality of principal components of each of the blocks extracted by the principal component analyzing unit, and calculates a migration distance between each of the principal components regarding the extracted principal component pair; and a migration factor index detection unit which detects, as a migration factor index, an index among the plurality of indexes configuring the principal components having a large migration distance among the migration distances between each of the principal components calculated by the migration distance evaluation unit.

Advantageous Effects of the Invention

According to the present invention, it is possible to automatically select indexes having local features from sensor data of a plurality of sensors. Other objects, configurations and effects will become apparent based on the explanation of the ensuing embodiments.

BRIEF DESCRIPTION OF DRAWINGS

FIG. 9 is a configuration diagram showing an example of an input screen of parameters related to the migration distance evaluation of Embodiment 1.

FIG. 11 is a configuration diagram showing an example of the sensor data management information of Embodiment 1.

FIG. 12 is a configuration diagram showing an example of the block management information of Embodiment 1.

FIG. 20 is a configuration diagram showing an example of the index management information of Embodiment 2.

FIG. 21 is a configuration diagram showing an example of the execution parameter management information of Embodiment 2.

DESCRIPTION OF EMBODIMENTS

Embodiment 1

Figure 1:
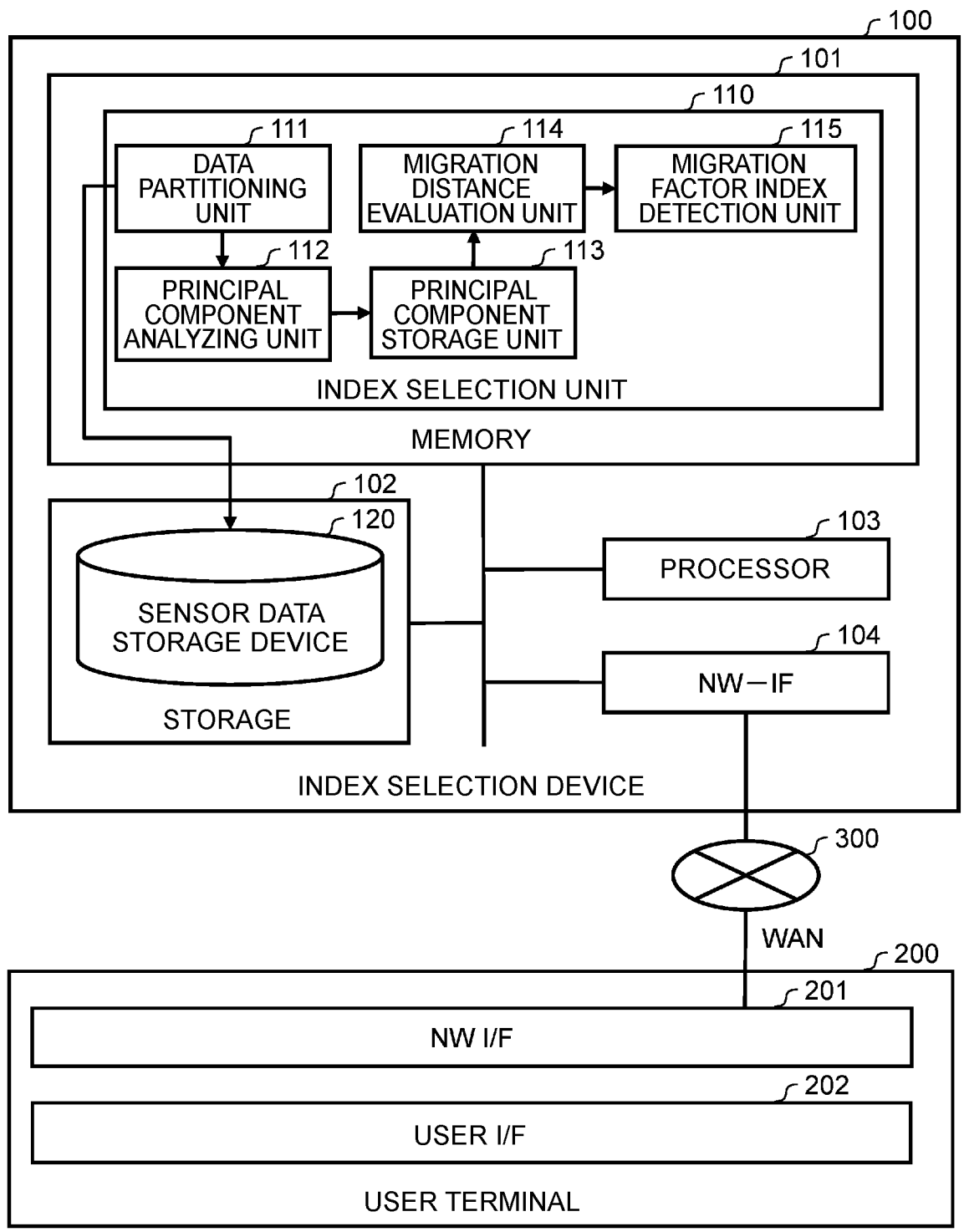
FIG. 1 is a system configuration diagram showing an example of a configuration of the computer system of Embodiment 1.

FIG. 1 is a system configuration diagram showing an example of a configuration of the computer system of Embodiment 1. In FIG. 1, the computer system is configured from an index selection device 100 and a user terminal 200. The index selection device 100 and the user terminal 200 are connected via a network such as a WAN (Wide Area Network) 300. However, the index selection device 100 and the user terminal 200 may also be connected via a LAN (Local Area Network) or any other network instead of the WAN.

The index selection device 100 is a system which provides a calculation program for selecting a proper number of indexes among a plurality of indexes. The index selection device 100 includes a memory 101, a storage 102, a processor 103, and a network interface (NW-IF) 104. The user terminal 200 is, for example, a device such as a personal computer or a tablet terminal. The user terminal 200 includes a memory (not shown), a storage (not shown), a processor (not shown), a display device (not shown), a network interface (NW I/F) 201 and a user interface (user I/F) 202.

The memory 101 includes an index selection unit 110, and the storage 102 includes a sensor data storage device 120. The index selection unit 110 is a program to be processed by the processor 103 and is configured, for example, from a data partitioning unit 111, a principal component analyzing unit 112, a principal component storage unit 113, a migration distance evaluation unit 114, and a migration factor index detection unit 115. The data partitioning unit 111 inputs data (sensor data) collected from a plurality of sensors (not shown) each associated with a plurality of indexes, and partitions the input sensor data by separating the sensor data into periods (i.e., partitions the input sensor data for each period), the principal component analyzing unit 112 applies principal component analysis to the data partitioned by the data partitioning unit 111 and extracts principal components, the principal component storage unit 113 retains the principal components extracted by the principal component analyzing unit 112, the migration distance evaluation unit 114 calculates a migration distance between two principal components retained by the principal component storage unit 113, and the migration factor index detection unit 115 selects an index (migration factor index) that is causing the migration distance to be large with regard to a pair of principal components (principal component pair) having a large migration distance based on the calculation result of the migration distance evaluation unit 114. The method of calculating the migration distance will be described later with reference to FIG. 6.

Note that the functions of the data partitioning unit 111, the principal component analyzing unit 112, the principal component storage unit 113, the migration distance evaluation unit 114, and the migration factor index detection unit 115 may be consolidated as one functional part, or separated into a plurality of functional parts.

Figure 2:
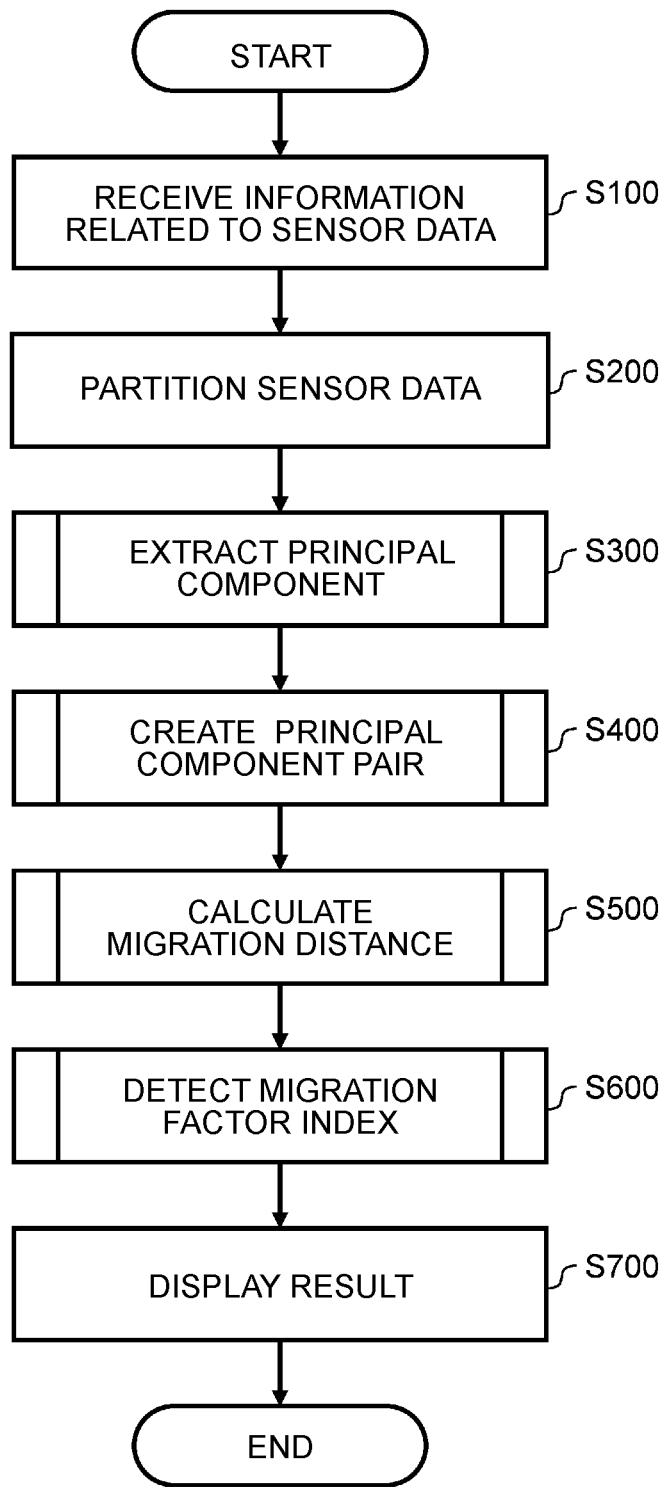
FIG. 2 is a flowchart for selecting the locally important indexes of Embodiment 1.

FIG. 2 is a flowchart for selecting the indexes of Embodiment 1. In FIG. 2, the user terminal 200 sends the path name and unit of data partition of the sensor data, which was input based on the user's operation, to the index selection device 100 via the NW I/F 201 (step S100).

The index selection device 100 acquires the path name and unit of data partition of the sensor data from the user terminal 200 and sends the sensor data of the respective sensors from the sensor data storage device 120 to the data partitioning unit 111, and the data partitioning unit 111 partitions a record of the sensor data of the respective sensors into a plurality of records (i.e., into a plurality of blocks) according to the unit of data partition (step S200). In the ensuing explanation, data obtained by partitioning the record of the sensor data is hereinafter referred to as a "block".

The principal component analyzing unit 112 acquires each of the blocks from the data partitioning unit 111, applies principal component analysis for each block to each of the blocks (data configuring each of the blocks), extracts information related to the principal components from each of the blocks, and stores the information related to each of the principal components in the principal component storage unit 113 (step S300). Moreover, the principal component analyzing unit 112 calculates, for each index configuring each of the principal components, a factor loading indicating a correlation of indexes configuring each of the principal components, and each of the principal components, based on the sensor data of each of the blocks. The flow of extracting the principal component will be explained later with reference to FIG. 3.

The migration distance evaluation unit 114 acquires the principal components (information) of each block from the principal component storage unit 113, creates a principal component pair between the blocks (step S400), and calculates a migration distance of the created principal component pair (step S500). The flow of creating the principal component pair will be explained later with reference to FIG. 4, and the flow of calculating the migration distance will be explained later with reference to FIG. 6.

The migration factor index detection unit 115 acquires the migration distance of the principal component pair from the migration distance evaluation unit 114, and acquires a migration factor index from the principal component pair with a large migration distance (step S600). The flow of detecting the migration factor index will be explained later with reference to FIG. 7.

The migration factor index detection unit 115 sends the migration factor index to the user I/F 202 via the network interface 104, and the user I/F 202 presents the migration factor index, as the detection result, to the user by displaying the migration factor index on a screen (step S700).

Figure 3:
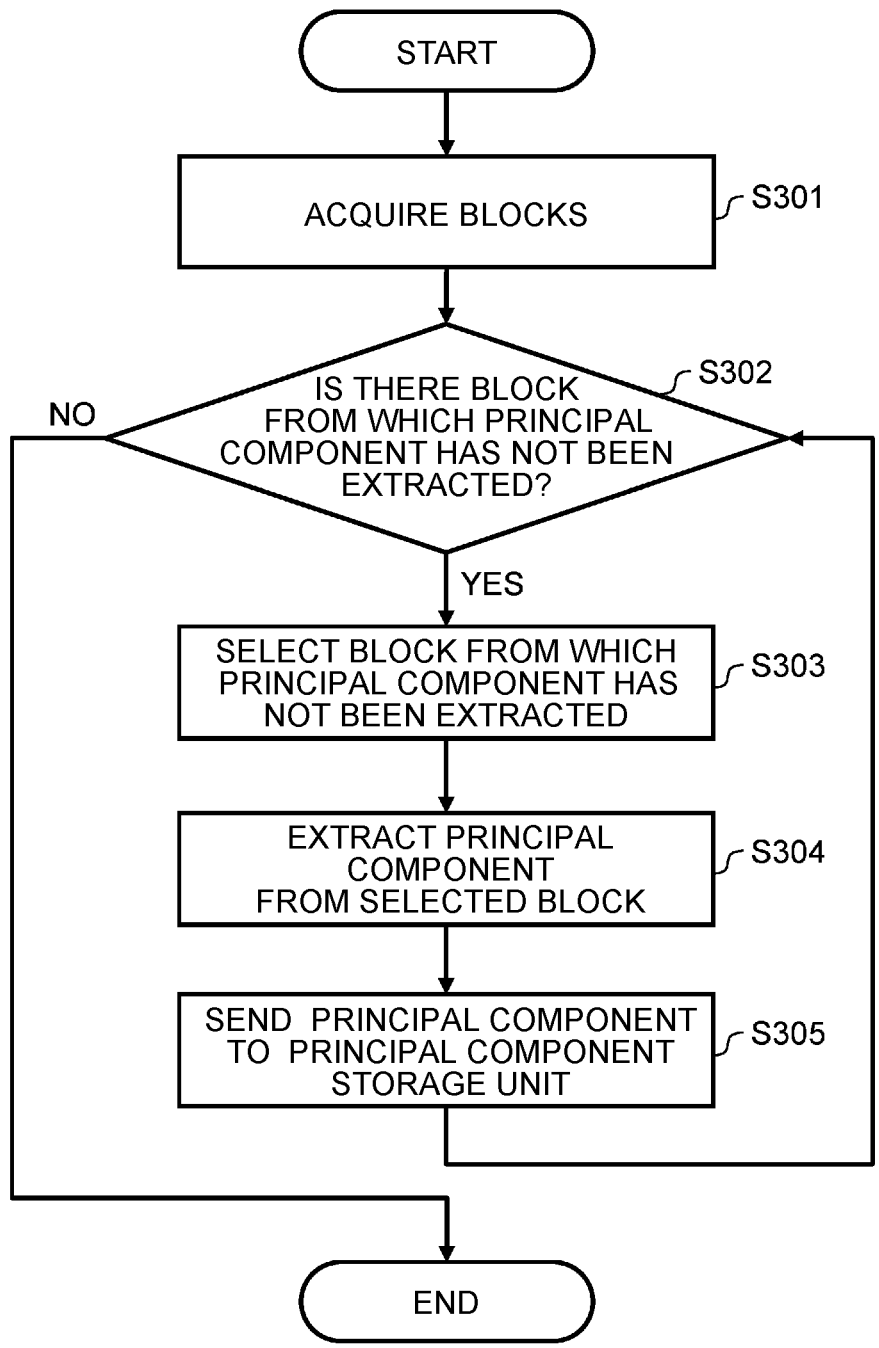
FIG. 3 is a flowchart for extracting the principal components of Embodiment 1.

FIG. 3 is a flowchart for extracting the principal components of Embodiment 1. In FIG. 3, the principal component analyzing unit 112 acquires blocks from the data partitioning unit 111 (step S301), and determines whether there is any block from which principal components have not been extracted (step S302).

If there are any blocks from which principal components have not been extracted (step S302: YES), the principal component analyzing unit 112 selects a block from which principal components have not been extracted (step S303), applies principal component analysis to the selected block and extracts principal components (step S304), sends the extracted principal components to the principal component storage unit 113 (step S305), and then returns to step S302. In step S302, if there are no blocks from which principal components have not been extracted (step S302: NO), the flow of extracting principal components is ended. The top five principal components having the highest contribution ratio are extracted. The number of principal components to be extracted may be three principal components or other quantities.

Figure 4:
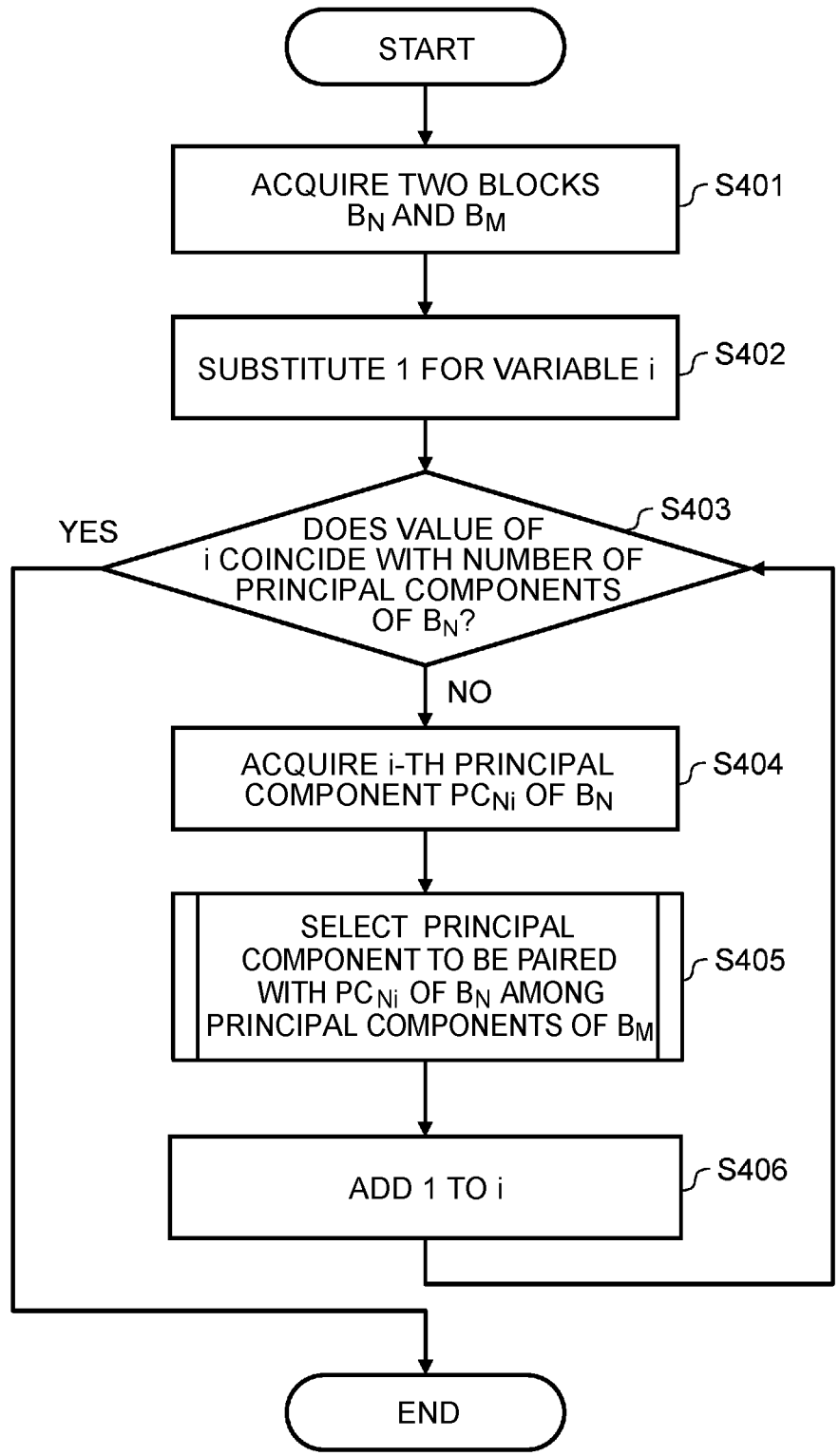
FIG. 4 is a flowchart for creating the principal component pair of Embodiment 1.

FIG. 4 is a flowchart for creating the principal component pair of Embodiment 1. In FIG. 4, when N and M are arbitrary different natural numbers, the migration distance evaluation unit 114 acquires two blocks $B_N$ and $B_M$ from the principal component storage unit 113 (step S401), subsequently substitutes 1 for variable i (step S402), and determines whether or not the value of i coincides with the number of principal components extracted from $B_N$ (step S403). When the value of i does not coincide with the number of principal components extracted from $B_N$ (step S403: NO), the migration distance evaluation unit 114 acquires the i-th principal component $PC_{Ni}$ of $B_N$ (step S404), selects the principal component to be paired with $PC_{Ni}$ of $B_N$ among the principal components of $B_M$ (step S405), adds 1 to i (step S406), and then returns to step S403. The flow of calculating the principal component to form the pair will be explained later with reference to FIG. 5. In step S403, when the value of i coincides with the number of principal components of $B_N$ (YES), the flow of creating the principal component pair is ended.

With regard to the method of selecting the two blocks, for example, two blocks of consecutive periods may be selected such as by selecting the blocks including January data as $B_N$ and selecting blocks including February data as $B_M$, or two blocks of separate periods may be selected such as by selecting the blocks including January data as $B_N$ and selecting blocks including June data as $B_M$.

Figure 5:
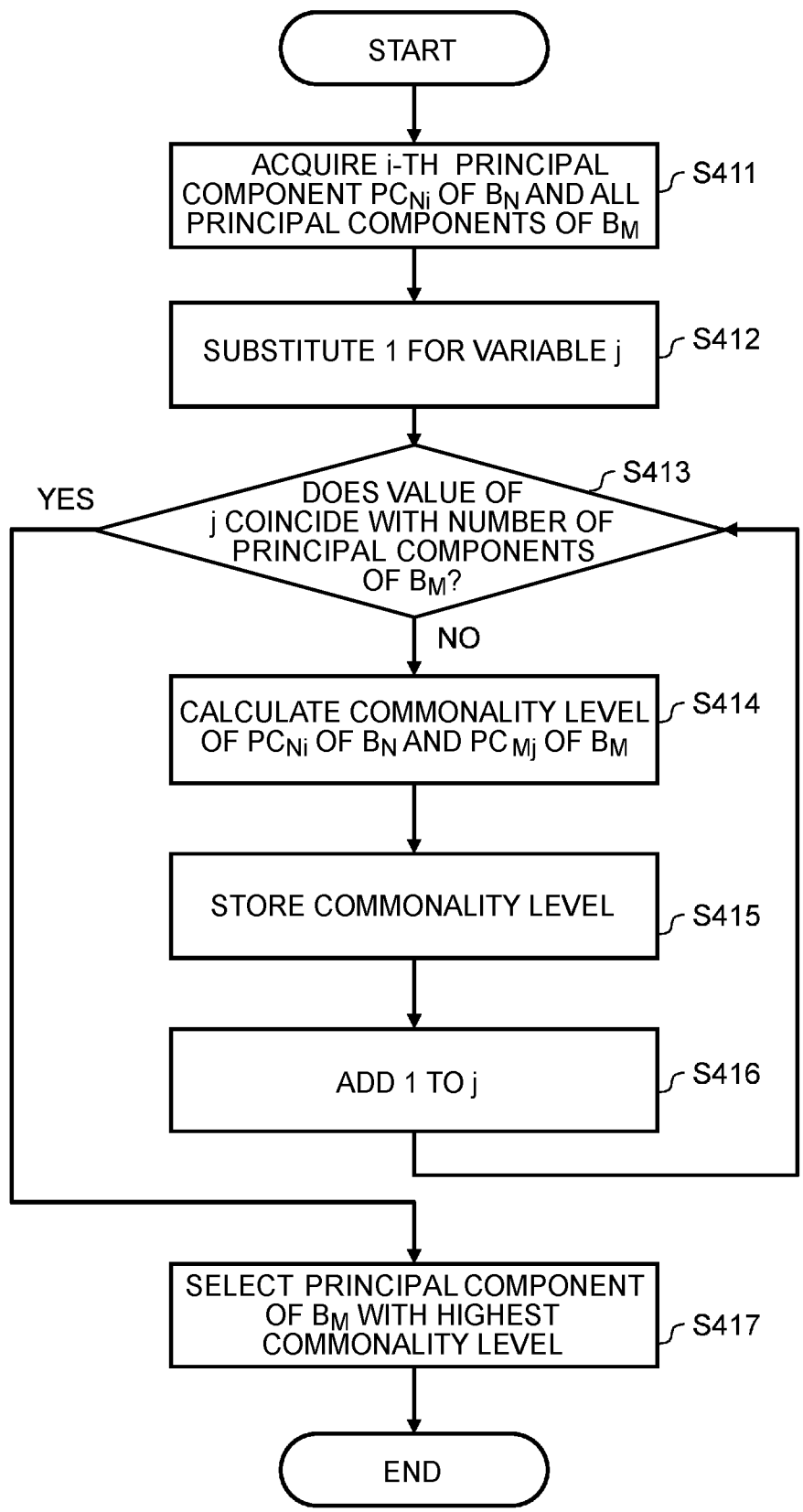
FIG. 5 is a flowchart for selecting the principal component pair of Embodiment 1.

FIG. 5 is a flowchart for selecting the principal component pair of Embodiment 1. In FIG. 5, the migration distance evaluation unit 114 acquires the i-th principal component $PC_{Ni}$ of $B_N$ and all principal components of $B_M$ from the principal component storage unit 113 (step S411), substitutes 1 for variable j (step S412), and determines whether or not the value of j coincides with the number of principal components of $B_M$ (step S413). When the value of j does not coincide with the number of principal components of $B_M$ (step S413: NO), the migration distance evaluation unit 114 calculates a commonality level related to $PC_{Ni}$ of $B_N$ and $PC_{Mj}$ of $B_M$ (step S414), stores the calculated commonality level (step S415), adds 1 to j (step S416), and then returns to step S413.

For example, the migration distance evaluation unit 114 calculates the commonality level according to the following method. In other words, with regard to $PC_{Ni}$ of $B_N$ and $PC_{Mj}$ of $B_M$, the migration distance evaluation unit 114 acquires the configuring indexes (indexes configuring the principal components) and factor loading, acquires common indexes among the configuring indexes, acquires indexes in which the distance is equal to or less than the threshold among the common indexes, and sets, as the commonality level, the value obtained by dividing the number of indexes in which the distance is equal to or less than the threshold by the number of configuring indexes. Here, the term "factor loading" refers to the correlation of the principal components and the indexes configuring the principal components. Moreover, the distance of indexes is, for example, the difference between the factor loadings of the indexes.

Specifically, with regard to $PC_{11}$ of $B_1$ and $PC_{21}$ of $B_2$, upon acquiring the indexes configuring the principal components and the factor loadings, the identifiers of the indexes configuring $PC_{11}$ were 19, 1, 2, and the factor loadings of the indexes configuring $PC_{21}$ were 0.7207, 0.7076, 0.6628, respectively. Moreover, the identifiers of the indexes configuring $PC_{21}$ were 19, 18, 1, and the factor loadings of the indexes configuring $PC_{21}$ were 0.7687, 0.7361, 0.7324, respectively. Next, as a result of acquiring common indexes, there were two indexes having the identifiers of 19 and 1, and, as a result of acquiring indexes in which the distance is equal to or greater than the threshold, there were two indexes having the identifiers of 19 and 1. This is because, when the threshold is set to 0.1, as a result of calculating the difference between the factor loadings in relation to the index having an identifier of 19, |0.7207−0.7687|=0.0480, and, as a result of calculating the difference between the factor loadings in relation to the index having an identifier of 1, |0.7076−0.7324|=0.0248, the two index are equal to or less than the threshold. Because the number of indexes in which the distance is equal to or less than the threshold is two indexes, and the number of indexes configuring the principal components is three indexes, when the number of indexes having a close distance is divided by the number of indexes configuring the principal components, the result will be 0.667 and, consequently, 66.7% is calculated as the commonality level.

Note that the foregoing calculation method is merely an example, and the present invention is not limited thereto. The number of common indexes may be used as the commonality level, or other calculation methods may also be used.

In step S413, when the value of j coincides with the number of principal components of $B_M$ (YES), the migration distance evaluation unit 114 acquires the principal component of $B_M$ with the highest commonality level (step S417), and then ends the flow of selecting the principal components.

Here, the migration distance evaluation unit 114 calculates, as a distance of indexes configuring each of the principal components, a difference of factor loadings of indexes which configure each of the principal components and are common among each of the blocks based on a calculation result (factor loading) of the principal component analyzing unit 112, identifies indexes in which the calculated index distance corresponds to the threshold (first threshold)=0.1 or less, calculates a commonality level of each of the principal components belonging to each of the blocks from the number of identified indexes "2" and the number of indexes "3" configuring the principal components, and extracts, as the principal component pair, the principal components belonging to the blocks in which the calculated commonality level is high.

Figure 6:
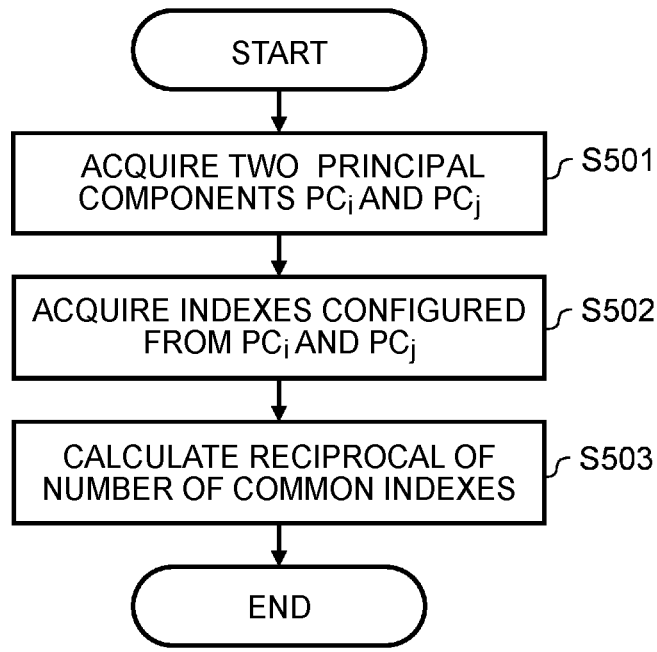
FIG. 6 is a flowchart for calculating the migration distance of Embodiment 1.

FIG. 6 is a flowchart for calculating the migration distance of Embodiment 1. In FIG. 6, the migration distance evaluation unit 114 acquires the principal component pair $PC_i$ and $PC_j$ from the principal component storage unit 113 (step S501), acquires the configuring indexes (indexes configuring the principal components) regarding $PC_i$ and $PC_j$ (step S502), calculates a reciprocal of the number of common indexes (step S503), and then ends the flow of calculating the migration distance.

For example, with regard to $PC_{11}$ of $B_1$ and $PC_{21}$ of $B_2$, as a result of acquiring the indexes configuring the principal components in step S502, the identifiers of the indexes configuring $PC_{11}$ were 19, 1, 2, 3, 18, the identifiers of the indexes configuring $PC_{21}$ were 19, 18, 1, 17, 2, and the identifiers of the common indexes were the four indexes having the identifiers of 19, 1, 2, 18. Thus, as a result of calculating the reciprocal of the number of common indexes in step S503, the reciprocal of the number of common indexes will be ¼=0.25.

Here, the migration distance evaluation unit 114 evaluates the indexes "19, 1, 2, 3, 18", "19, 18, 1, 17, 2" which belong to the principal component pair and configure each of the principal component by separating the indexes into the indexes "19, 1, 2, 18" which belong to the principal component pair and are common among each of the principal component, and other indexes "3, 17", calculates the number of indexes "4" which belong to the principal component pair and are common among each of the principal components based on the evaluation result, and calculates the migration distance between each of the principal components belonging to the principal component pair based on the calculated value; for example, the reciprocal of the indexes.

Note that, in relation to the calculation of the migration distance, the foregoing method of calculating the reciprocal of the number of common indexes is merely an example, and the present invention is not limited thereto. It is also possible to calculate the difference of the factor loadings for each index in relation to the common indexes and use the average of calculated differences as the migration distance, or other calculation methods may also be used.

Figure 7:
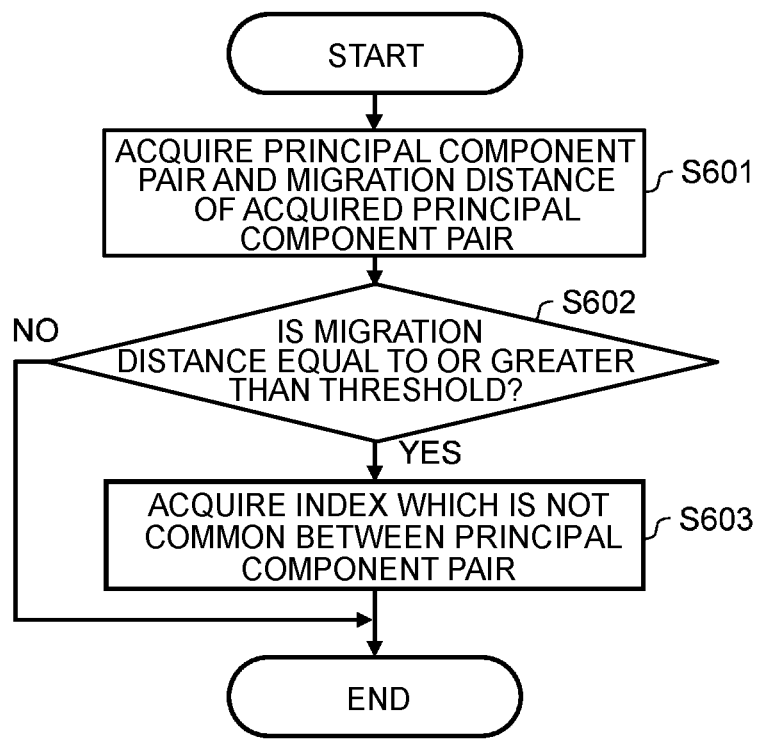
FIG. 7 is a flowchart for detecting the migration factor index of Embodiment 1.

FIG. 7 is a flowchart for detecting the migration factor index of Embodiment 1. In FIG. 7, the migration factor index detection unit 115 acquires the principal component pair and the migration distance (migration distance between the principal components) of the foregoing pair (principal component pair) from the migration distance evaluation unit 114 (step S601), and determines whether or not the migration distance is equal to or greater than the threshold (step S602). When the acquired migration distance is equal to or greater than the threshold (=0.2%) (step S602: YES), the migration factor index detection unit 115 acquires an index which is not common between the acquired principal component pair, sets the local feature flag 1304 of the acquired index to "T", and stores this in the index management information 1300 (refer to FIG. 15) of the memory 101 (step S603).

For example, with regard to $PC_{11}$ of $B_1$ and $PC_{21}$ of $B_2$ as the principal component pair, 0.25 is acquired as the migration distance of the principal component pair in step S601, and whether or not the migration distance is equal to or greater than the threshold is confirmed in step S602. Here, $PC_{11}$ is configured from the indexes having the identifiers of 19, 1, 2, 3, 18, and $PC_{21}$ is configured from the indexes having the identifiers of 19, 18, 1, 17, 2. Because the migration distance is 0.25(%) and the threshold is 0.2(%), the indexes having the identifiers of 3, 17 are acquired as the indexes which are not common between the principal component pair in step S603. Subsequently, the entries configured from "3" in the index ID 1301, "1" in the principal component ID 1302, "1" in the block ID 1303 and "T" in the local feature flag 1304 are stored in the index management information 1300 of FIG. 15, and the entries configured from "17" in the index ID 1301, "1" in the principal component ID 1302, "2" in the block ID and "T" in the local feature flag are stored in the index management information 1300.

Here, the migration factor index detection unit 115 detects, as the migration factor index, the indexes "3, 17" among the indexes belonging to the principal component pair which are not common among each of the principal components by referring to the evaluation result of the migration distance evaluation unit 114 on the condition that the migration distance between each of the principal components calculated by the migration distance evaluation unit 114 is equal to or greater than the threshold (second threshold)=0.2(%).

Figure 8:
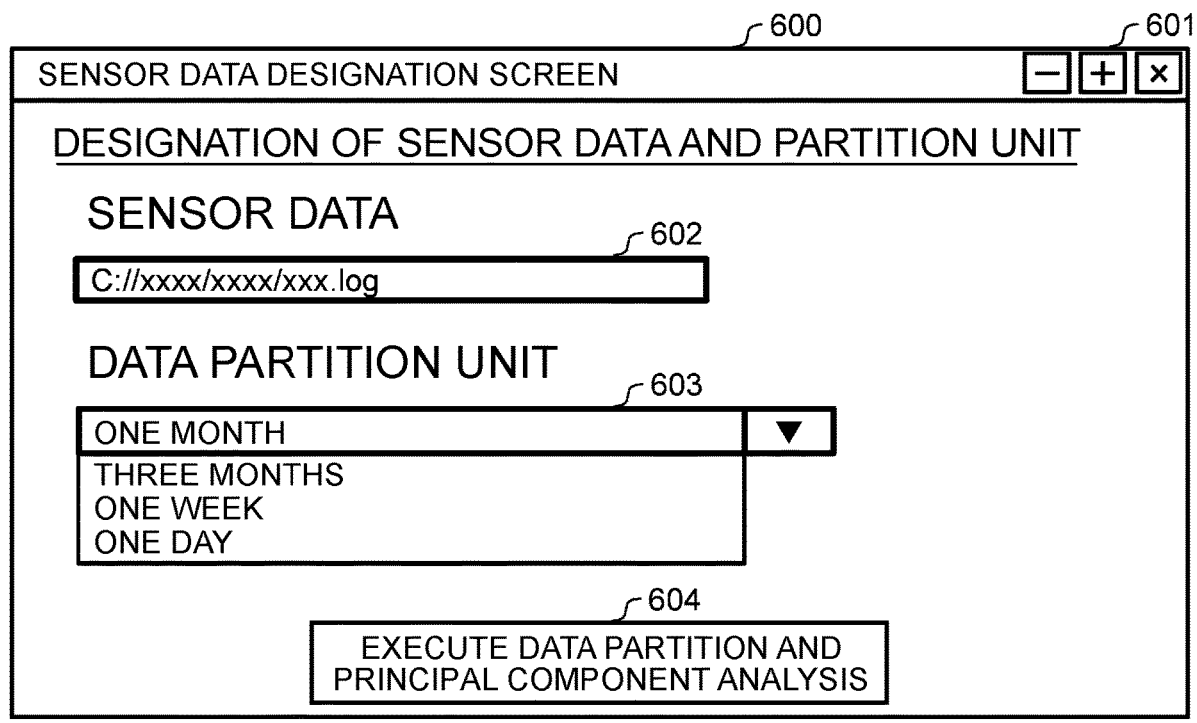
FIG. 8 is a configuration diagram showing an example of the sensor data designation screen of Embodiment 1.

FIG. 8 is a configuration diagram showing an example of the sensor data designation screen of Embodiment 1. In FIG. 8, a sensor data designation screen 600 on the display device of the user terminal 200 includes an end button 601, a sensor data designation form 602, a data partition unit designation form 603, and an execution button 604.

The end button 601 is an operation button for ending the index selection program based on the user's operation. The sensor data designation form 602 is an input form for the user to designate the path to the sensor data.

The data partition unit designation form 603 is an input form for the user to designate the unit of partition (one month, three months, one week, etc.) of the sensor data.

The execution button 604 is a button for executing the data partitioning and the principal component analysis based on the user's operation.

FIG. 9 is a configuration diagram showing an example of an input screen of parameters related to the migration distance evaluation of Embodiment 1. In FIG. 9, a migration distance evaluation screen 700 on the display device of the user terminal 200 includes an end button 701, an index commonality level threshold input form 702, a migration distance determination threshold 703, an execution button 704, a block pair selection button 705, and a block principal component pair confirmation column 706.

The end button 701 is an operation button for ending the index selection program based on the user's operation. The index commonality level threshold input form 702 is an input form for the user to designate the index commonality level threshold. The designated threshold is used for determining the principal component pair.

The migration distance determination threshold 703 is an input form for the user to designate the threshold for determining whether or not the migration distance is great.

The execution button 704 is a button for executing the migration distance evaluation program based on the user's operation. The block pair selection button 705 is a form for the user to designate the two blocks. The block principal component pair confirmation column 706 is a column for displaying the principal component pair in relation to the two blocks designated in the block pair selection form. The block principal component pair confirmation column 706 displays, for example, the principal components of January data, the principal component of February data, and information related to the commonality level and migration distance.

Figure 10:
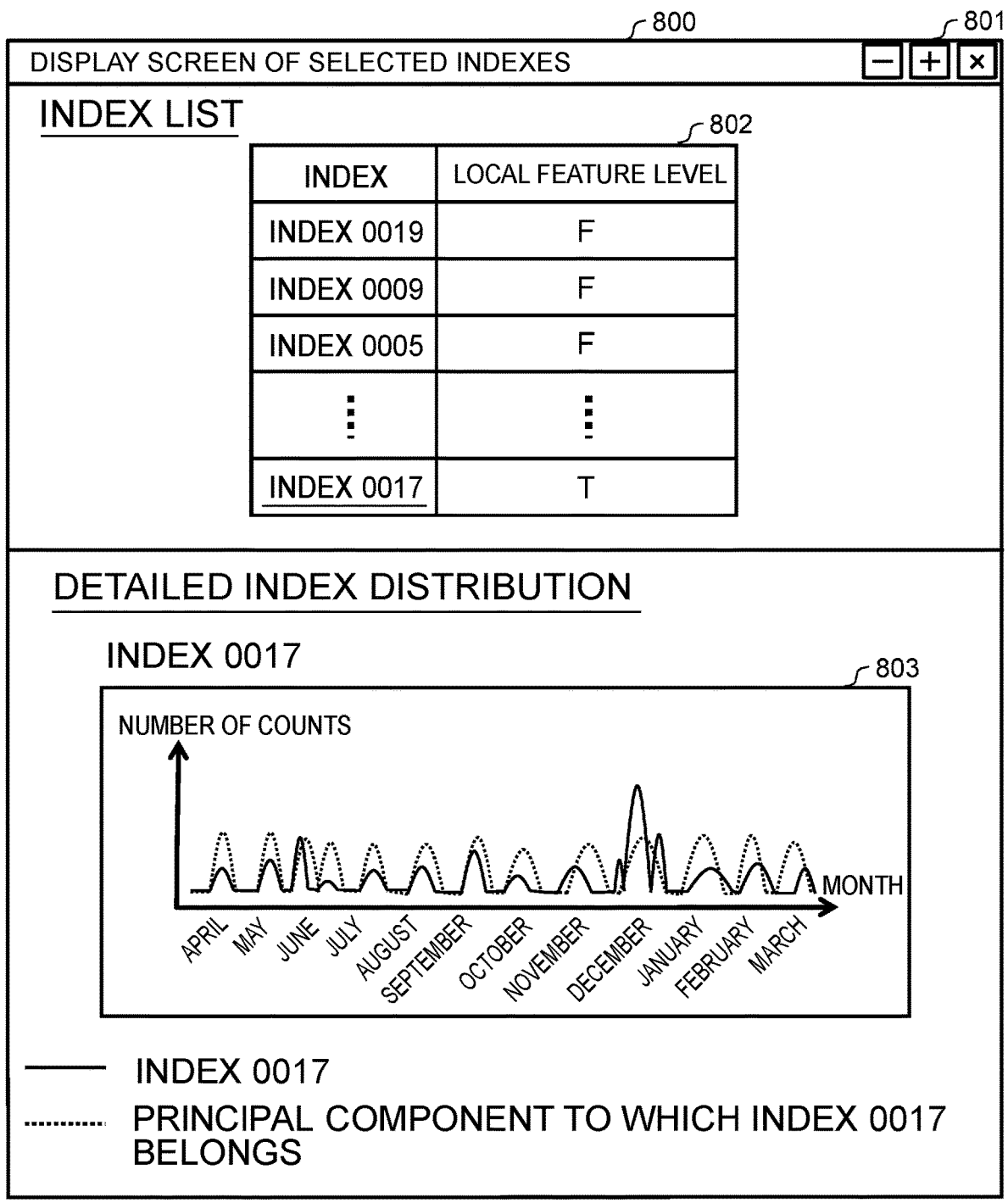
FIG. 10 is a configuration diagram showing an example of a display screen of the selected indexes of Embodiment 1.

FIG. 10 is a configuration diagram showing an example of a display screen of the selected indexes of Embodiment 1. In FIG. 10, an index display screen 800 on the display device of the user terminal 200 includes an end button 801, an index list column 802, and an index distribution detailed display column 803.

The end button 801 is an operation button for ending the index selection program based on the user's operation. The index list column 802 is a column for displaying the indexes selected by the index selection program. The index list column 802 displays information related to the indexes and the local feature level. For example, when the index 0017 is selected as an index having a local feature based on the processing of the index selection program, "T" is displayed in the local feature label in correspondence with the index 0017.

The index distribution detailed display column 803 is a column which displays the distribution of the indexes and the principal components belonging to the indexes. When the user selects an index from the index list column 802, the index display screen 800 displays, in the index distribution detailed display column 803, the distribution of the selected index, and the distribution of the principal components belonging to the selected index. Here, for example, among the number of counts of the index 0017, when the number of counts of December is greater than the number of counts of other months, the number of counts of December is displayed with emphasis in comparison to the number of counts of other months.

Here, the migration factor index detection unit 115 or the processor 103 sends, to the user terminal 200, display information for displaying information related to the migration factor index detected by the migration factor index detection unit 115 and the principal components to which the migration factor index belongs.

FIG. 11 is a configuration diagram showing an example of the sensor data management information of Embodiment 1. In FIG. 11, sensor data management information 900 is information stored in the sensor data storage device 120, and includes multiple entries configured from a log ID 901, a data acquisition time 902, an "index 0001" 903, an "index 0002" 904, an "index 2000" 905 and so on.

The log ID 901 is an identifier of the entries stored in the sensor data management information 900. The data acquisition time 902 is the time that the index selection device 100 acquired data from a plurality of sensors. The "index 0001" 903, the "index 0002" 904 and the "index 2000" 905 are values collected from the respective sensors. The values of each of the indexes are values respectively collected from specific sensors, and, for example, the "index 0001" 903 is a value collected from the sensor which counts the number of medium receptions, and the "index 0002" 904 is a value collected from the sensor which counts the number of reception reservations.

For example, as a result of collective values respectively from the sensor 0001 (index 0001), the sensor 0002 (index 0002), and the sensor 2000 (index 2000) on Jan. 1, 2017 at 1:00, when the values were respectively "0", "0", and "146", the information will correspond to one entry in which "1" is stored in the log ID 901, "2017/01/0101:00:00" is stored in the data acquisition time 902, "0" is stored in the "index 0001" 903, "0" is stored in the "index 0002" 904, and "146" is stored in the "index 2000" 905.

FIG. 12 is a configuration diagram showing an example of the block management information of Embodiment 1. In FIG. 12, block management information 1000 is information stored in the memory 101, and includes multiple entries configured from a log ID 901 and a block ID 1002.

The block ID 1002 is an identifier of the block. For example, when the sensor data having a log ID of 1 belongs to a block having a block ID of 1, the information will correspond to one entry which stores "1" in the log ID 1001 and stores "1" in the block ID.

Figure 13:
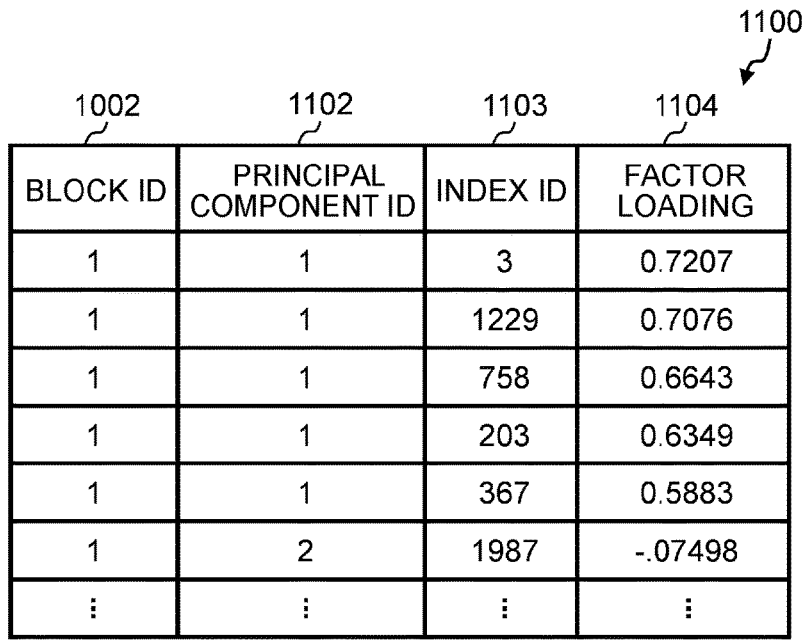
FIG. 13 is a configuration diagram showing an example of the principal component management information of Embodiment 1.

FIG. 13 is a configuration diagram showing an example of the principal component management information of Embodiment 1. In FIG. 13, principal component management information 1100 is information stored in the memory 101, and includes multiple entries configured from a block ID 1002, a principal component ID 1102, an index ID 1103 and a factor loading 1104.

The principal component ID 1102 is an identifier of the principal components. With regard to the identifier of the principal components, for example, by numbering the principal components in order from those having the largest contribution ratio, "1" can be assigned to the first principal component, and "2" can be assigned to the second principal component.

The index ID 1103 is an identifier of the indexes, and the factor loading 1104 is a value that is calculated by the principal component analyzing unit 112 and is a correlation of the principal components of the indexes.

For example, when the factor loading with the index having an index ID of "3" is 0.7207 with regard to the first principal component of the block having a block ID of "1", the information will correspond to the one entry in which "1" is stored in the block ID 1002, "1" is stored in the principal component ID 1102, "3" is stored in the index ID 1103, and "0.7207" is stored in the factor loading 1104. However, in the foregoing example, the order of principal components is used as the identifier of the principal components.

Figure 14:
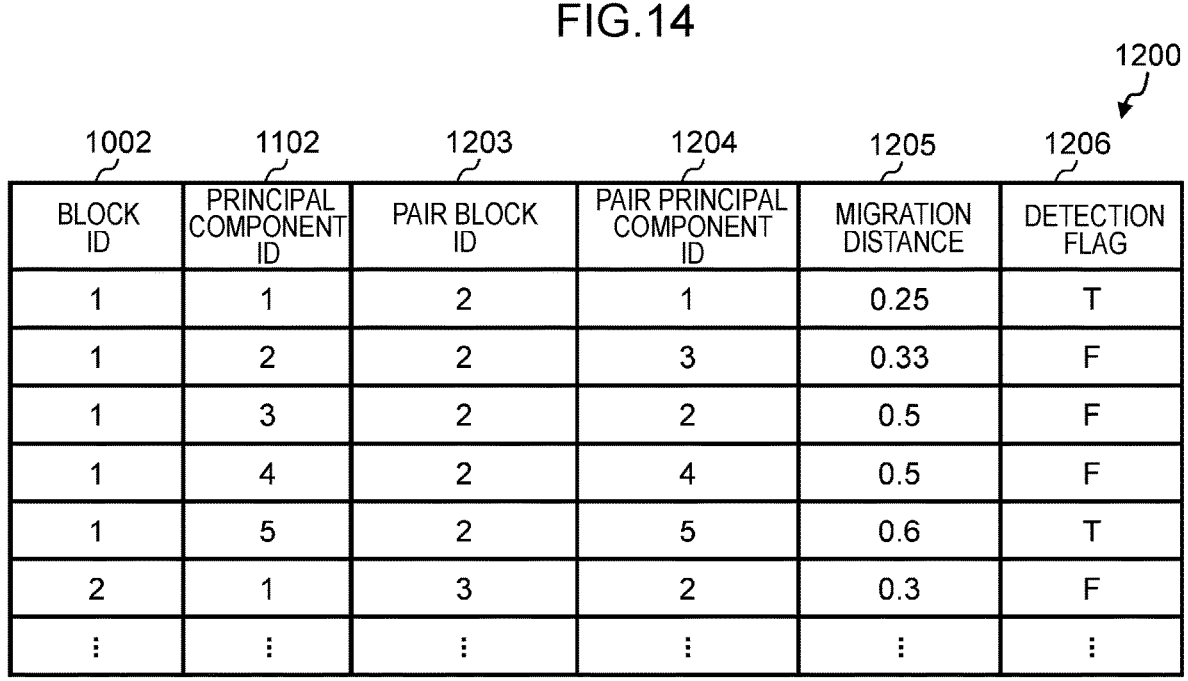
FIG. 14 is a configuration diagram showing an example of the migration distance management information of the principal component pair of Embodiment 1.

FIG. 14 is a configuration diagram showing an example of the migration distance management information of the principal component pair of Embodiment 1. In FIG. 14, principal component pair migration distance management information 1200 is information stored in the memory 101, includes multiple entries configured from a block ID 1002, a principal component ID 1102, a pair block ID 1203, a pair principal component ID 1204, a migration distance 1205 and a detection flag 1206.

The pair block ID 1203 is an identifier of the blocks to which the principle components belong with regard to the principal components that form a principal component pair, and the pair principal component ID 1204 is an identifier of the principal components. The migration distance 1205 is the migration distance of the principal component pair.

The detection flag 1206 is a flag for detecting the principal component pair having a large migration distance, and "T" is stored when the migration distance of the principal component pair is equal to or greater than the threshold, and "F" is stored in other cases (i.e., when the migration distance of the principal component pair is less than the threshold).

For example, when the first principal component of the block having a block ID of 1 and the first principal component of the block having a block ID of 2 are a principal component pair, the migration distance of the principal component pair is 0.25, and the migration distance is equal to or greater than the threshold, the information will correspond to the entry in which "1" is stored in the block ID 1002, "1" is stored in the principal component ID 1102, "2" is stored in the pair block ID 1203, "1" is stored in the pair principal component ID 1204, "0.25" is stored in the migration distance 1205, and "T" is stored in the detection flag 1206. However, in the foregoing example, the order of principal components is used as the identifier of the principal components.

Figure 15:
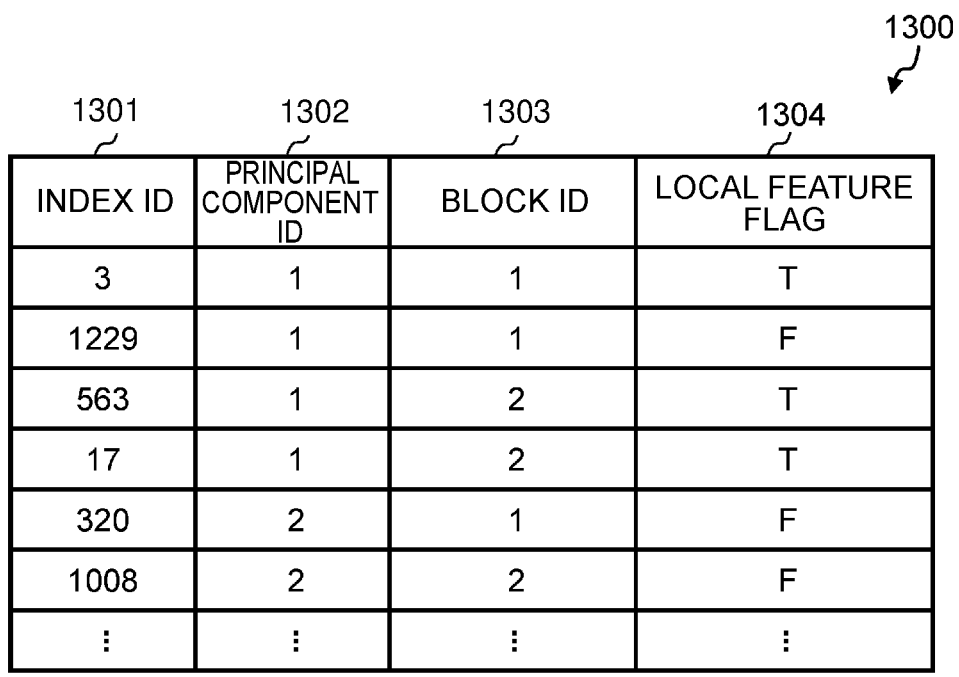
FIG. 15 is a configuration diagram showing an example of the index management information of Embodiment 1.

FIG. 15 is a configuration diagram showing an example of the index management information of Embodiment 1. In FIG. 15, index management information 1300 is information stored in the memory 101, and includes multiple entries configured from an index ID 1103, a principal component ID 1102, a block ID 1002 and a local feature flag 1304.

The local feature flag 1304 is a flag which indicates whether or not the index is an index having a local feature, and "T" is stored when the index has a local feature, and "F" is stored in other cases (i.e., when the index does not have a local feature).

For example, when the index having an index ID of "3" is an index having a local feature with regard to the first principal component of the block having a block ID of "1", the information will correspond to the entry in which "3" is stored in the index ID 1103, "1" is stored in the principal component ID 1102, "1" is stored in the block ID 1002, and "T" is stored in the local feature flag 1304. However, in the foregoing example, the order of principal components is used as the identifier of the principal components.

As explained above, the index selection device 100 in this embodiment acquires sensor data of a plurality of sensors from the sensor data storage device 120, partitions a record of the acquired sensor data into a plurality of blocks for each period in the data partitioning unit 111, sends each of the blocks (block data) to the principal component analyzing unit 112, and extracts the principal components for each block in the principal component analyzing unit 112. The principal component analyzing unit 112 sends, to the migration distance evaluation unit, the principal components which were extracted from the respective blocks with regard to two different blocks, the migration distance evaluation unit 114 calculates the distance between the principal components and sends the calculation result to the migration factor index detection unit 115, and the migration factor index detection unit 115 detects, as a migration factor index having a local feature or a locally important index (index which locally has a major impact on the principal components), the indexes "3, 17" among the indexes configuring the principal components which are not common between the principal component pair regarding the principal component pair in which the distance between the principal component is equal to or greater than the threshold. It is thereby possible to automatically acquire indexes having a local feature.

According to this embodiment, it is possible to automatically select indexes having a local feature from the sensor data of a plurality of sensors.

Embodiment 2

In Embodiment 2, differences in comparison to Embodiment 1 are mainly explained. Embodiment 1 enabled the selection of locally important indexes. Embodiment 2 additionally comprises a means for automatically adjusting the block size and the migration distance determination threshold.

Figure 16:
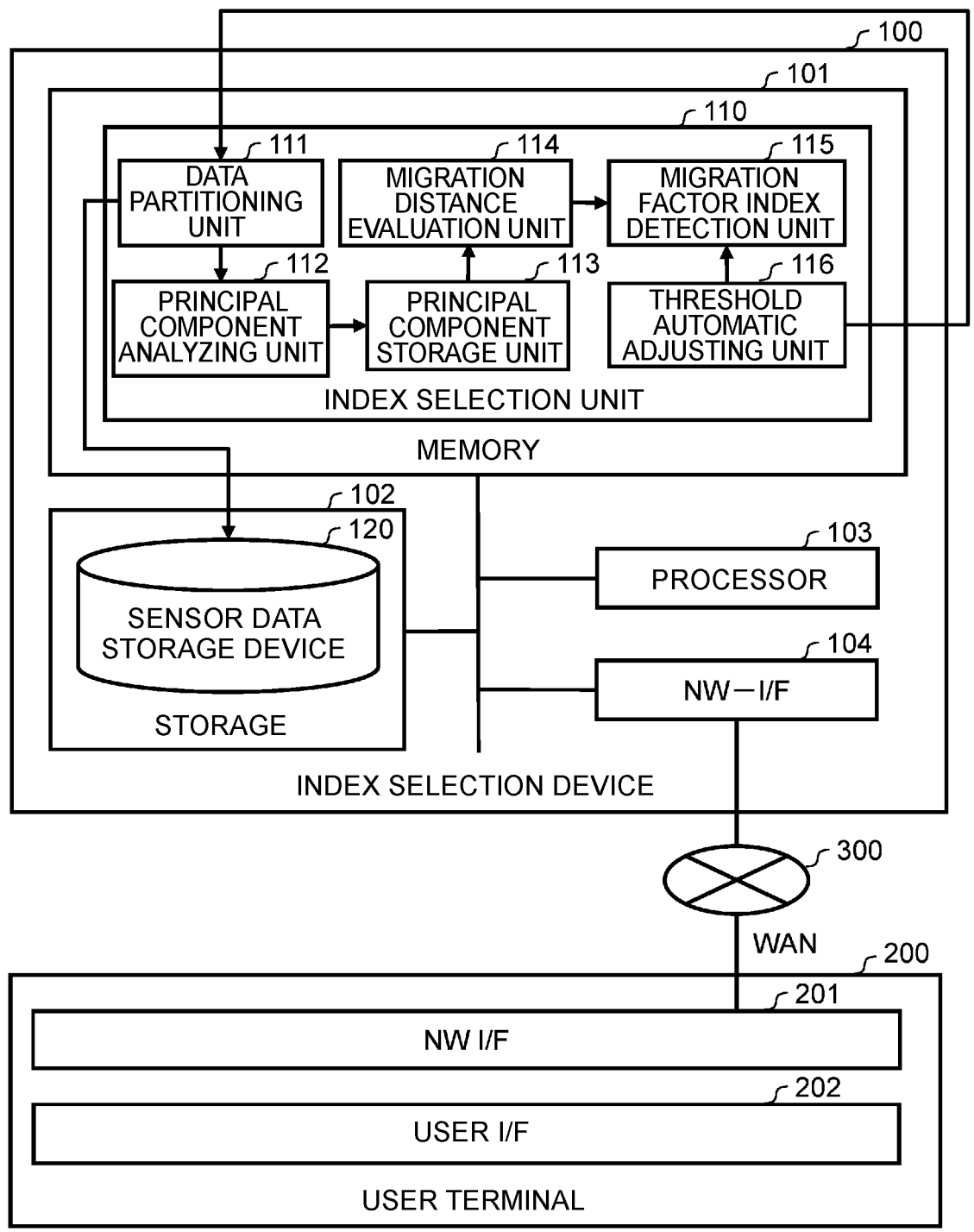
FIG. 16 is a system configuration diagram showing an example of a configuration of the computer system of Embodiment 2.

FIG. 16 is a system configuration diagram showing an example of a configuration of the computer system of Embodiment 2. In FIG. 16, the index selection unit 110 includes a threshold automatic adjusting unit 116 in addition to the same constituent elements of Embodiment 1.

The threshold automatic adjusting unit 116 receives information related to the indexes to become the failure factor from the user I/F 202, and automatically adjusts the block size (number of blocks) and the migration distance determination threshold by using information related to the indexes to become the failure factor.

Figure 17:
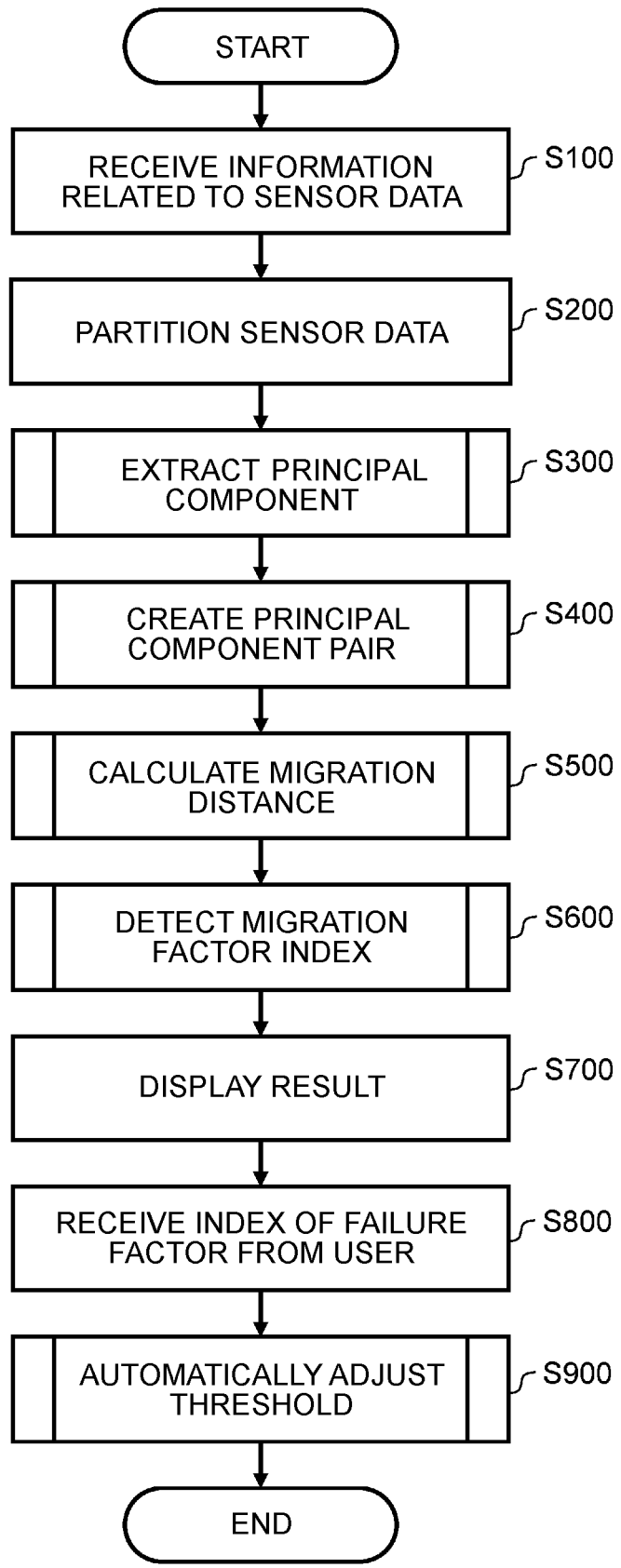
FIG. 17 is a flowchart for selecting the locally important indexes of Embodiment 2.

FIG. 17 is a flowchart for selecting the locally important indexes of Embodiment 2. In FIG. 17, the index selection unit 110 includes, in addition to the same processing (step S100 to step S700) as Embodiment 1, processing (step S800) of receiving information related to the indexes to become the failure factor from the user, and processing (step S900) of automatically adjusting the threshold (migration distance determination threshold). The flow of automatically adjusting the threshold is shown in FIG. 18.

Figure 18:
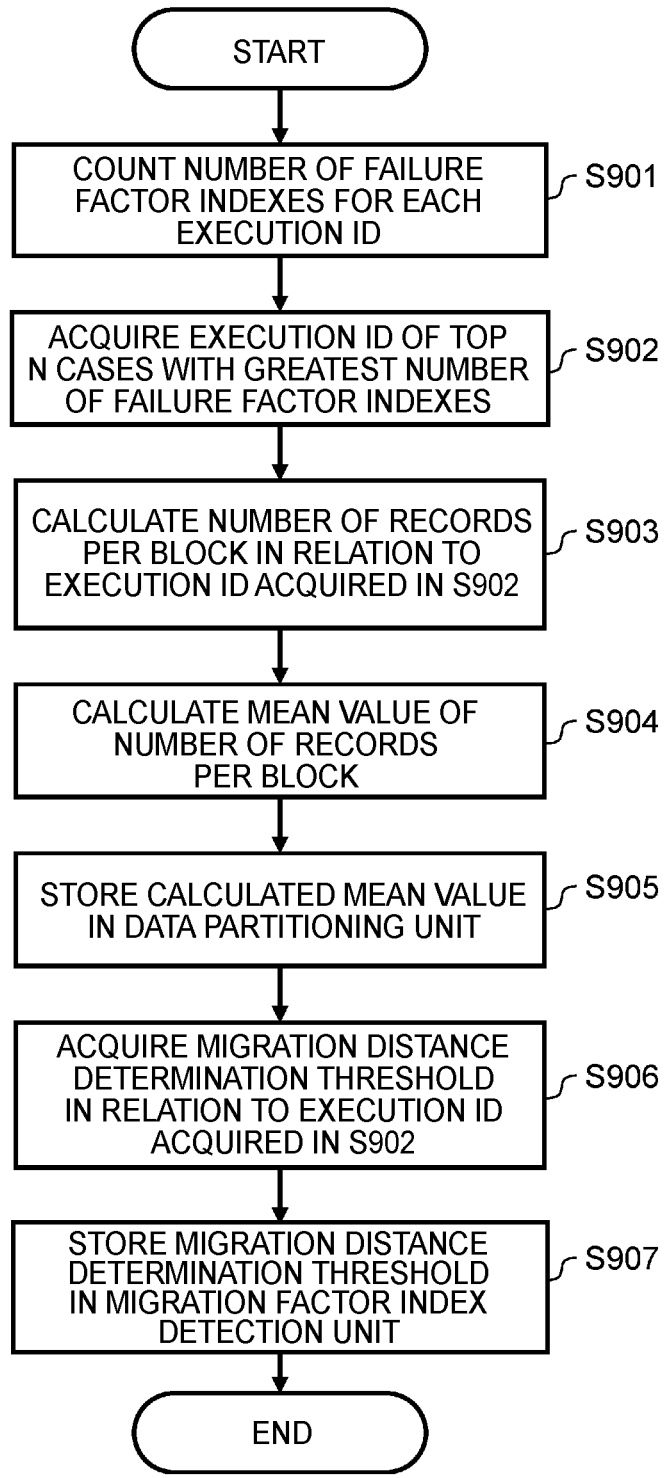
FIG. 18 is a flowchart for automatically adjusting the threshold of Embodiment 2.

FIG. 18 is a flowchart for automatically adjusting the threshold of Embodiment 2. In FIG. 18, the threshold automatic adjusting unit 116 acquires all entries from the index management information 1300 of FIG. 20, counts the number of entries (number of failure factor indexes) in which the failure factor flag 1305 is "T" for each execution ID 1306 (step S901), acquires the execution ID 1306 with regard to the top N cases of the number of entries that were counted (step S902), calculates the number of records per block with regard to the execution ID 1306 acquired in S902 (step S903), calculates the average (mean value) of the number of records per block (step S904), and stores the calculated mean value in the data partitioning unit 111 (step S905). Upon receiving sensor data from the sensor data storage device 120, the data partitioning unit 111 determines the number of blocks by dividing the number of records of the received sensor data by the mean value stored in step S905. Subsequently, the threshold automatic adjusting unit 116 acquires the migration distance determination threshold from the memory 101 with regard to the execution ID 1306 acquired in S902 (step S906), stores the acquired migration distance determination threshold in the migration factor index detection unit 115 (step S907), and then ends the processing in this routine.

Figure 19:
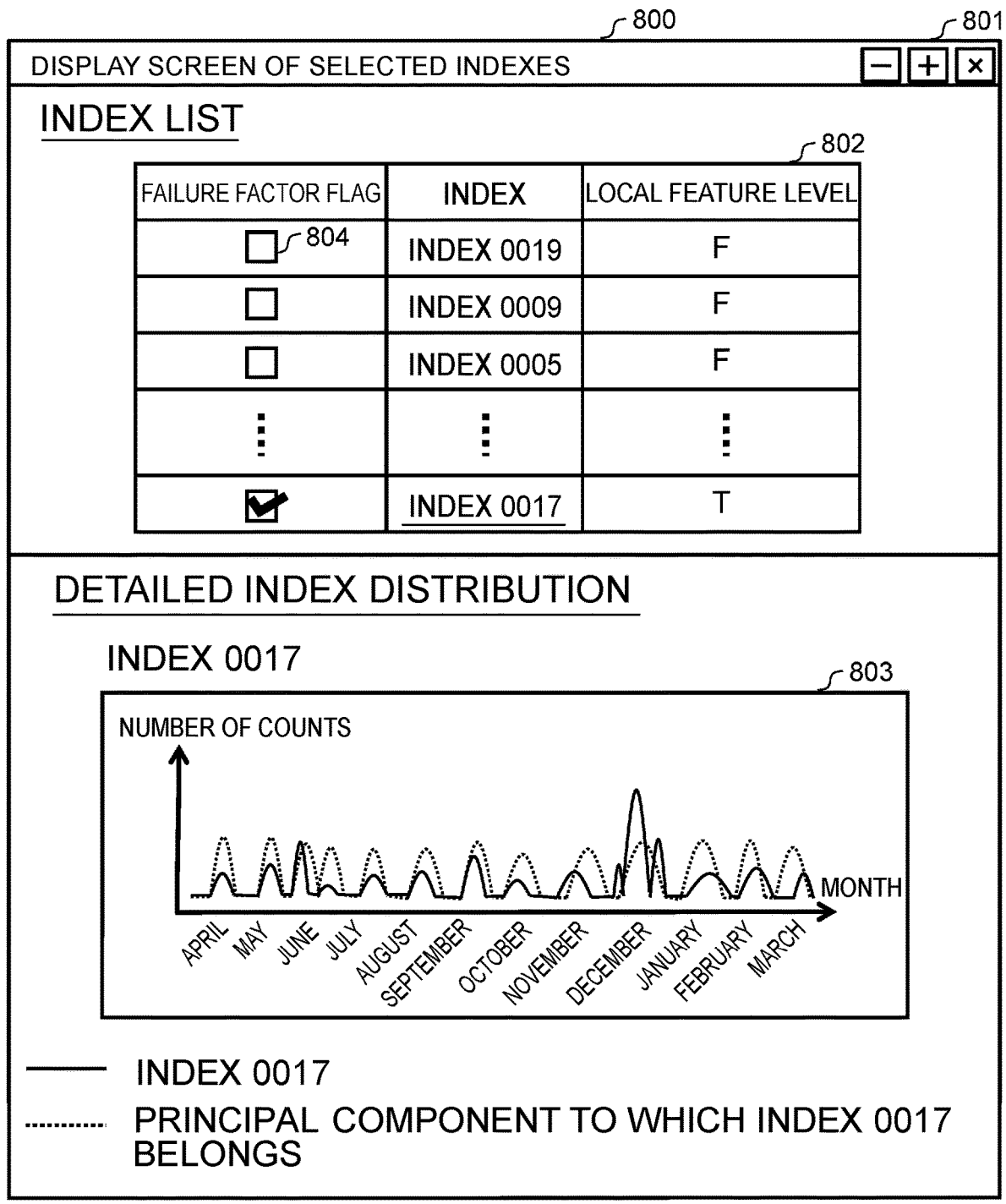
FIG. 19 is a configuration diagram showing an example of a display screen of the selected indexes of Embodiment 2.

FIG. 19 is a configuration diagram showing an example of a display screen of the selected indexes of Embodiment 2. In FIG. 19, the index display screen 800 includes a failure factor flag 804 in addition to the same constituent elements of Embodiment 1.

The failure factor flag 804 is a flag for indicating the index which is a failure factor. The user marks a check in the failure factor flag 804 for an index which is a cause of failure. The index selection program uses the threshold automatic adjusting unit 116 to adjust the block size and the migration distance determination threshold by using the information related to the failure factor index.

Here, the migration factor index detection unit 115 or the processor 103 sends, to the user terminal 200, display information for displaying information related to the migration factor index detected by the migration factor index detection unit 115 and the principal components to which the migration factor index belongs, and adds, to the display information, selection information for selecting the indexes to become the failure factor with regard to the migration factor index.

FIG. 20 is a configuration diagram showing an example of the index management information of Embodiment 2. In FIG. 20, index management information 1300 is information stored in the memory 101, and includes a failure factor flag 1305 and an execution ID 1306 in addition to the same constituent elements of Embodiment 1.

The failure factor flag 1305 is a flag indicating the failure factor, and "T" is stored when the index is the cause of the failure, and "F" is stored in other cases (i.e., when the index is not the cause of the failure).

The execution ID 1306 is an identifier that is linked to the execution of the index selection program. For example, when the index having an index ID of "3" is an index having a local feature and that index is a failure factor with regard to the first principal component of the block having a block ID of "1", the information will correspond to the entry in which "3" is stored in the index ID 1301, "1" is stored in the principal component ID 1302, "1" is stored in the block ID 1303, "T" is stored in the local feature flag 1304, "T" is stored in the failure factor flag 1305, and "1" is stored in the execution ID 1306. However, in the foregoing example, the order of principal components is used as the identifier of the principal components.

FIG. 21 is a configuration diagram showing an example of the execution parameter management information of Embodiment 2. In FIG. 21, the execution parameter management information 1400 is information stored in the memory 101, and includes an execution ID 1306, an execution start time 1402, a number of records 1403, a number of blocks 1404, and a migration distance determination threshold 1405.

The execution start time 1402 is the time that the execution of the index selection program was started. The number of records 1403 is the number of records of sensor data that was in the index selection program. The number of blocks 1404 is the number of partitions of sensor data. The migration distance determination threshold 1405 is the threshold for determining the migration distance.

For example, when the index selection program was executed on May 1, 2017 at 13:01:45, sensor data of 540060 records was read, the number of partitions of the records of sensor data was set to six, and the migration distance determination threshold was set to 0.2, the information will correspond to the entries in which "1" is stored in the execution ID 1306, "2017/05/0113:01:45" is stored in the execution start time 1402, "540,060" is stored in the number of records 1403, "6" is stored in the number of blocks 1404, and "0.2" is stored in the migration distance determination threshold 1405.

In this embodiment, the threshold automatic adjusting unit 116 can input, from the user terminal 200, information for identifying the indexes to become the failure factor, and automatically adjust the number of partitions of the blocks (block size) in the data partitioning unit 11 and the threshold in the migration factor index detection unit 115 based on the input information. Consequently, the migration factor index detection unit 115 can detect new migration factor indexes to become the locally important indexes by using the threshold that was adjusted by the threshold automatic adjusting unit 116.

According to this embodiment, after automatically adjusting the threshold, it is possible to select indexes having local features that differ from the indexes having local features which were selected before the threshold was automatic adjusted.

Moreover, a part or all of the respective configurations, functions, processing units and processing means described above may be realized with hardware such as by designing an integrated circuit. Furthermore, the present invention may also be realized based on a program code of software which realizes the functions of the embodiments. In the foregoing case, a recording medium which stores the program code is provided to a computer, and a processor equipped in the computer reads the program code stored in the storage medium. Here, the program code read from the storage medium will realize the functions of the foregoing embodiments, and the program code itself and the storage medium which stores the program code will configure the present invention. As the storage medium for supplying the foregoing program code, used may be, for example, a flexible disk, a CD-ROM, a DVD-ROM, a hard disk, a SSD (Solid State Drive), an optical disk, an opto-magnetic disk, a CD-R, a magnetic tape, a non-volatile memory card, or a ROM.

Moreover, the program code which realizes the functions described in this embodiment may be implemented, for example, by using a wide range of programs or script languages such as assembler, C/C++, perl, Shell, PHP, and Java (registered trademark).

Furthermore, by distributing the program code of software which realizes the functions of the foregoing embodiments via a network, the program code may be stored in a storage means such as a hard disk or a memory of a computer or a storage medium such as a CD-RW or a CD-R, and a processor equipped in the computer may read the program code stored in the storage means or the storage medium and execute the program code.

The foregoing embodiments indicate control lines and information lines that are deemed necessary for explanation, and do not necessary indicate all control lines and information lines that are required in a product. All configurations may also be mutually connected.

REFERENCE SIGNS LIST 100 index selection device, 110 index selection unit, 111 data partitioning unit, 112 principal component analyzing unit, 113 principal component storage unit, 114 migration distance evaluation unit, 115 migration factor index detection unit, 120 sensor data storage device, 200 user terminal

The invention claimed is:

1. An index selection device, comprising:
a data partitioning unit which inputs sensor data of a plurality of sensors, and partitions the sensor data of each sensor of the plurality of sensors into a plurality of blocks, each sensor sensing data about equipment, each sensor associated with an index of a plurality of indexes, and each block indicating a predetermined period of time;

a principal component analyzing unit which automatically applies principal component analysis to each block of the plurality of blocks partitioned by the data partitioning unit, and extracts a plurality of principal components from each block of the plurality of blocks;

a migration distance evaluation unit which automatically extracts, from two different blocks, two principal components that form a principal component pair among the plurality of principal components from each block of the plurality of blocks extracted by the principal component analyzing unit, and calculates a migration distance between the two principal components that form the principal component pair; and a migration factor index detection unit which automatically detects, as a migration factor index, an index among the plurality of indexes configuring the principal components having a migration distance between the two principal components greater than a threshold, wherein the index detected by the migration factor index detection unit is used to detect a failure of the equipment before the failure of the equipment occurs, wherein the index detected by the migration factor index detection unit has a local feature, and wherein the migration factor index detection unit sends to a user terminal, display information causing the user terminal to display indexes of principal component pairs and whether the indexes include local feature levels, and a chart showing a distribution of the indexes and principal components belonging to the indexes over the predetermined time period, wherein the principal component analyzing unit calculates, for each index configuring each of the principal components, a factor loading indicating a correlation of indexes configuring each of the principal components, and each of the principal components, based on the sensor data of each block of the plurality of blocks, and wherein the migration distance evaluation unit calculates, as a distance of indexes configuring each of the principal components, a difference of factor loadings of indexes which configure each of the principal components and are common among each block of the plurality of blocks based on a calculation result of the principal component analyzing unit, identifies indexes in which the distance of the indexes is equal to or less than a first threshold, calculates a commonality level of each of the principal components belonging to each block of the plurality of blocks from a number of identified indexes and a number of indexes configuring the principal components, and extracts, as the principal component pair, the principal components belonging to the plurality of blocks in which the calculated commonality level is highest.

2. The index selection device according to claim 1, wherein the migration distance evaluation unit evaluates the indexes which belong to the principal component pair and configure each of the principal components by separating the indexes into indexes which belong to the principal component pair and are common among each of the principal components, and other indexes, calculates a number of indexes which belong to the principal component pair and are common among each of the principal components based on the evaluation, and calculates the migration distance between each of the principal components belonging to the principal component pair based on the calculated number, and wherein the migration factor index detection unit detects, as the migration factor index, an index among the indexes belonging to the principal component pair which is not common among each of the principal components by referring to the evaluation by the migration distance evaluation unit based on a condition that the migration distance between each of the principal components calculated by the migration distance evaluation unit is equal to or greater than the threshold, which is a second threshold.

3. The index selection device according to claim 2, further comprising:

a threshold automatic adjusting unit which inputs information for identifying an index to become a failure factor, and automatically adjusts a number of partitions of the plurality of blocks in the data partitioning unit and the second threshold in the migration factor index detection unit based on the information.

4. The index selection device according to claim 1, wherein the migration factor index detection unit adds, to the display information, selection information for selecting an index to become a failure factor for the migration factor index.

5. The index selection device according to claim 1, wherein the index detected by the migration factor index detection unit is input to a machine learning algorithm to create a boundary line for separating the sensor data before the failure and other data, and perform failure prognosis by comparing the created boundary line and the sensor values.

6. An index selection method, comprising:

a data partitioning step of inputting sensor data of a plurality of sensors, and partitioning the sensor data of each sensor of the plurality of sensors into a plurality of blocks, each sensor sensing data about equipment, each sensor associated with an index of a plurality of indexes, and each block indicating a predetermined amount of time;

a principal component analyzing step of automatically applying principal component analysis to each block of the plurality of blocks partitioned in the data partitioning step, and extracting a plurality of principal components from each block of the plurality of blocks;

a migration distance evaluation step of automatically extracting, from two different blocks, two principal components that form a principal component pair among the plurality of principal components from each block of the plurality of blocks extracted in the principal component analyzing step, and calculating a migration distance between the two principal components that form the principal component pair; and a migration factor index detection step of automatically detecting, as a migration factor index, an index among the plurality of indexes configuring the principal components having a migration distance between the two principal components greater than a threshold, wherein the index detected in the migration factor index detection step is used to detect a failure of the equipment before the failure of the equipment occurs, wherein the index detected in the migration factor index detection step has a local feature, and wherein the migration factor index detection step sends to a user terminal, display information causing the user terminal to display indexes of principal component pairs and whether the indexes include local feature levels, and a chart showing a distribution of the indexes and principal components belonging to the indexes over the predetermined time period, wherein, in the principal component analyzing step, for each index configuring each of the principal components, a factor loading indicating a correlation of indexes configuring each of the principal components, and each of the principal components, is calculated based on the sensor data of each block of the plurality of blocks, and wherein, in the migration distance evaluation step, as a distance of indexes configuring each of the principal components, a difference of factor loadings of indexes which configure each of the principal components and are common among each block of the plurality of blocks is calculated based on a calculation result of the principal component analyzing step, indexes in which the distance of the indexes is equal to or less than a first threshold are identified, a commonality level of each of the principal components belonging to each block of the plurality of blocks is calculated from a number of identified indexes and a number of indexes configuring the principal components, and, as the principal component pair, the principal components belonging to the plurality of blocks in which the calculated commonality level is highest is extracted.

7. The index selection method according to claim 6,
wherein, in the migration distance evaluation step, the indexes which belong to the principal component pair and configure each of the principal components are evaluated by separating the indexes into indexes which belong to the principal component pair and are common among each of the principal components, and other indexes, a number of indexes which belong to the principal component pair and are common among each of the principal components is calculated based on the evaluation, and the migration distance between each of the principal components belonging to the principal component pair is calculated based on the calculated number, and wherein, in the migration factor index detection step, an index among the indexes belonging to the principal component pair which is not common among each of the principal components is detected, as the migration factor index, by referring to the evaluation by the migration distance evaluation step based on a condition that the migration distance between each of the principal components calculated in the migration distance evaluation step is equal to or greater than the threshold, which is a second threshold.

8. The index selection method according to claim 7, further comprising:
a threshold automatic adjusting step of inputting information for identifying an index to become a failure factor, and automatically adjusting a number of partitions of the plurality of blocks in the data partitioning step and the second threshold in the migration factor index detection step based on the information.

9. The index selection method according to claim 8,
wherein, in the migration factor index detection step, selection information for selecting an index to become a failure factor for the migration factor index is added to the display information.

10. The index selection method according to claim 6,
wherein the index detected in the migration factor index detection step is input to a machine learning algorithm to create a boundary line for separating the sensor data before the failure and other data, and perform failure prognosis by comparing the created boundary line and sensor values.

11. An index selection program stored in a non-transitory computer readable medium which causes a data management computer to execute:
a data partitioning step of inputting sensor data of a plurality of sensors, and partitioning the sensor data of each sensor of the plurality of sensors into a plurality of blocks, each sensor sensing data about equipment, each sensor associated with an index of a plurality of indexes, and each block indicating a predetermined period of time;

a principal component analyzing step of automatically applying principal component analysis to each block of the plurality of blocks partitioned in the data partitioning step, and extracting a plurality of principal components from each block of the plurality of blocks;

a migration distance evaluation step of automatically extracting, from two different blocks, two principal components that form a principal component pair among the plurality of principal components from each block of the plurality of blocks extracted in the principal component analyzing step, and calculating a migration distance between the two principal components that form the principal component pair; and a migration factor index detection step of automatically detecting, as a migration factor index, an index among the plurality of indexes configuring the principal components having a migration distance between the two principal components greater than a threshold, wherein the index detected in the migration factor index detection step is used to detect a failure of the equipment before the failure of the equipment occurs, wherein the index detected in the migration factor index detection step has a local feature, and wherein the migration factor index detection step sends to a user terminal, display information causing the user terminal to display indexes of principal component pairs and whether the indexes include local feature levels, and a chart showing a distribution of the indexes and principal components belonging to the indexes over the predetermined time period, wherein, in the principal component analyzing step, for each index configuring each of the principal components, a factor loading indicating a correlation of indexes configuring each of the principal components, and each of the principal components, is calculated based on the sensor data of each block of the plurality of blocks, and wherein, in the migration distance evaluation step, as a distance of indexes configuring each of the principal components, a difference of factor loadings of indexes which configure each of the principal components and are common among each block of the plurality of blocks is calculated based on a calculation result of the principal component analyzing step, indexes in which the distance of the indexes is equal to or less than a first threshold are identified, a commonality level of each of the principal components belonging to each block of the plurality of blocks is calculated from a number of identified indexes and a number of indexes configuring the principal components, and, as the principal component pair, the principal components belonging to the plurality of blocks in which the calculated commonality level is highest is extracted.

12. The index selection program according to claim 11, wherein the index detected in the migration factor index detection step is input to a machine learning algorithm to create a boundary line for separating the sensor data before the failure and other data, and perform failure prognosis by comparing the created boundary line and sensor values.

* * * * *